C. B. & J. Hardick,
Steam Pump Valve.

Nº 39,568. Patented Aug. 18, 1863.

Witnesses:
Thos. Geo Harvey
Chas. H. Smith

Inventor:
Charles B. Hardick
John Hardick

UNITED STATES PATENT OFFICE.

CHARLES B. HARDICK AND JOHN HARDICK, OF BROOKLYN, NEW YORK.

IMPROVEMENT IN VALVES FOR PUMPS.

Specification forming part of Letters Patent No. 39,568, dated August 18, 1863.

*To all whom it may concern:*

Be it known that we, CHARLES B. HARDICK and JOHN HARDICK, of Brooklyn, in the county of Kings and State of New York, have invented, made, and applied to use a certain new and useful Improvement in Valves for Pumps; and we do hereby declare the following to be a full, clear, and exact description of our said improvement, reference being had to the annexed drawings, making part of this specification, wherein—

Figure 1:
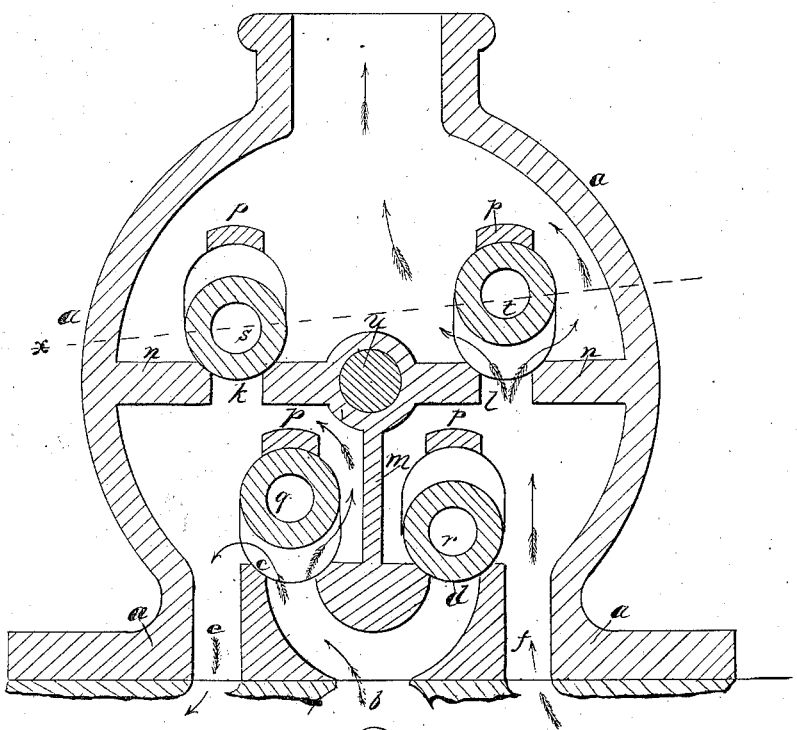
Figure 2:
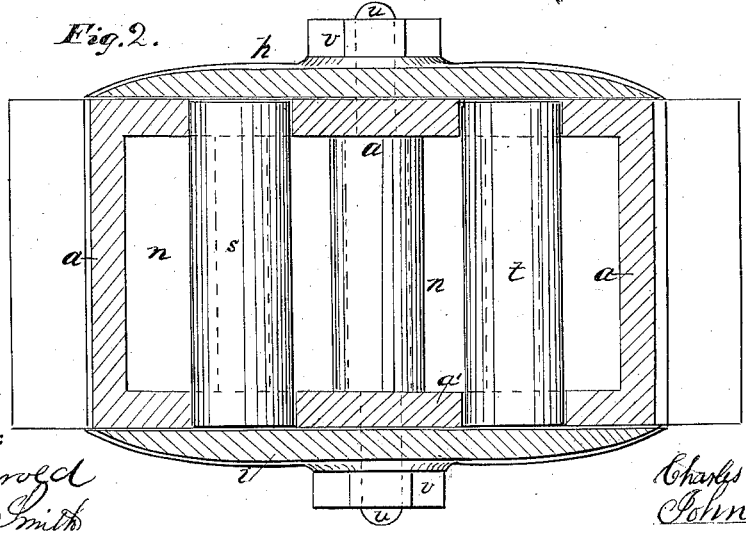

Figure 1 is a vertical section of our valve-chest and valves, and Fig. 2 is a sectional plan at the line $x\,x$.

Similar marks of reference indicate the same parts.

Valves for pumps have heretofore been made cylindrical and kept in position by loops setting over them at short distances apart.

The nature of our said invention consists in a stop extending from side to side of the valve-chest over the seat, against which the valve rises, and consequently takes an extended and complete bearing on the valve, preventing the injury ensuing to valves heretofore constructed, in which the concussion of the valve in rising is taken on one or more small bearings. The valves which we employ are cylindrical or prismatic, and not confined by a hinge, but guided and retained in position while moving between the seat and stop.

We have represented cylindrical valves in our drawings, and will now proceed to describe our said invention of the aforesaid stop to the valve, and the various devices beneficially connected therewith, in order to fully show the modes of applying our said invention.

In the drawings, $a$ is the valve-chest, made as a cylinder, closed at the ends, as at $a'$. $b$ is the inlet or induction-port, branching to the seats $c$ and $d$; and $e$ and $f$ are the ports leading to the respective ends of a cylindrical pump, as usual. $k$ and $l$ are the seats forming the eduction-ports. $m$ is a partition between $c$ and $d$; and $n$ is a partition in which the ports $k$ and $l$ are formed. Each valve for these ports is formed as a cylinder extending across the valve-chest. These cylindrical valves are to be made true and fit the seats, said seats being previously turned or bored out correctly and the valves ground into place. The valves should be of metal and hollow, so as not to be too heavy, but rubber, hard rubber, lignum-vitæ, or other material may be employed. Each valve has an arched stop (marked $p$) above, to limit its upward movement when the water is passing through the seat. We have marked these valves $q, r, s$, and $t$, taking the respective seats $c, d, k$, and $t$. It will be seen that the respective seats extending through the sides $a'$ of the valve-chest, and also the under concave sides of the stops $p$, being also bored or trued up in the same manner, cause the said openings through the sides $a'$ to become the guides for the ends of the respective valves, and in consequence of this mode of construction the valve-chest can be made as a hollow casting in one piece, and the valves themselves are introduced from the sides of the chest, being entered endwise. Thus the construction and grinding in of the valve are greatly facilitated, and they are easily removed for cleaning or repair.

In order to retain the valves in the chest and keep the said chest tight, we employ the heads $h$ and $i$, Fig. 2, that set against the sides $a'$ of the chest, covering up the openings therein, and these heads may either be ground in place or have a thin elastic packing.

$u$ is a bolt passing through the chest, and provided with nuts $v\,v$ to hold these heads firmly to the sides of the chest, by the removal of which, however, one or both heads may be taken off and the valves inspected, removed, cleaned, or repaired.

The alternate opening and closing of the valves at the commencement and termination of the stroke of the pump takes place as usual, and need not be further described.

In cases where a prismatic valve is substituted for the cylindrical valve the shape of the seat and the guide openings in the sides of the chest must be adapted thereto, but the the general construction and operation will be identical.

What we claim, and desire to secure by Letters Patent, is—

The stops $p$, extending from side to side of the valve-chest over the seat, and receiving the cylindrical or prismatic valves, as specified.

In witness whereof we have hereunto set our signatures this 3d day of March, 1863.

CHARLES B. HARDICK.
    JOHN HARDICK.

Witnesses:
 THOS. GEO. HAROLD,
 CHAS. H. SMITH.